(No Model.)
T. A. MACAULAY.
MECHANICAL MOVEMENT.
No. 278,806. Patented June 5, 1883.
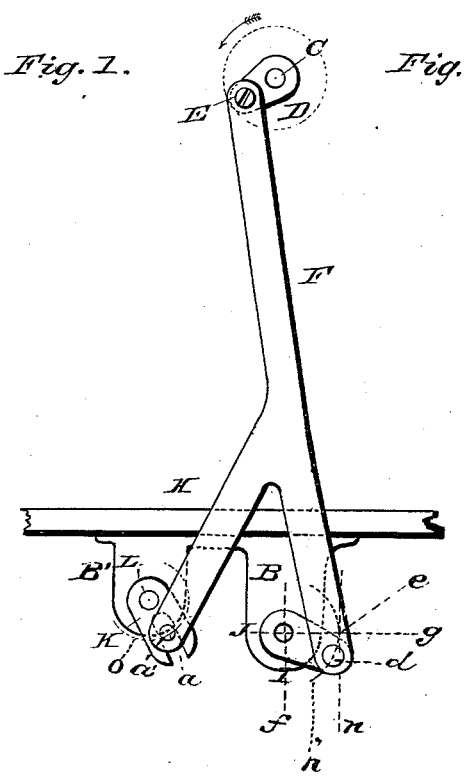
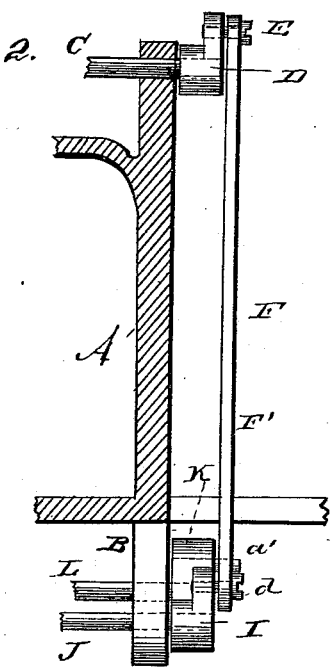
Witnesses:
Phil C. Dietrich
Arthur E. Howell
Inventor:
Thos. A. Macaulay

UNITED STATES PATENT OFFICE.

THOMAS A. MACAULAY, OF NEW YORK, N. Y.

MECHANICAL MOVEMENT.

SPECIFICATION forming part of Letters Patent No. 278,806, dated June 5, 1883.

Application filed April 9, 1883. (No model.)

*To all whom it may concern:*

Be it known that I, THOMAS A. MACAULAY, of the city, county, and State of New York, have invented certain new and useful Improvements in Mechanical Movements, of which the following, with the accompanying drawings, is a specification.

Similar letters refer to like parts.

The object of this invention is to convert continuous rotary motion into oscillating reciprocatory motion in such manner as to cause the axial motion of a rock shaft or arm to pass through an arc of ninety degrees, (more or less,) as hereinafter more fully described, and pointed out in the claims.

In the drawings, Figure 1 is a front view. Fig. 2 is a side view of the same, partly in section.

C is a rotating shaft, having a crank, D, and crank-pin E.

F is a pitman connected to the crank D by pin E, and to an arm, I, by pin $d$. The arm I is pivoted to a fixed point, B, by pin J.

H is an extension of the pitman, connecting it with an arm, K, by pin $a'$, engaging in a slot, $a$, in said arm K, which is fixed to a shaft, L, journaled in a suitable bearing, B'.

The operation is as follows: Rotary motion being imparted to the crank D, a reciprocating motion is given to the pitman F and its extension H. This movement of the pitman carries the arm I with it, but in a curved line concentric with the center of the pivot J, as indicated by the dotted line $h$. It will be observed that the line $h$, followed by the center of the pin $d$, is as it approaches each end of its stroke constantly nearing a line, $f$, drawn vertically through the center J, from the time it leaves the point $e$ of the line $g$, drawn horizontally through the center of the pin $d$. This movement of the lower end of the pitman in a curved path carries the extension H and its pin $a'$ in a corresponding direction, and as the pin $a'$ engages in the slot $a$ of the arm K the result of the motion of the arm I upon the arm K to and from the vertical line $f$ at each end of the stroke is to increase the axial motion of the arm K to the extent that the pin $d$ in the arm I approaches the line $f$ from a line, $n$, drawn vertically through the point $e$ of the position of the center of the pin $d$ farthest from the line $f$. The increased axial motion of the arm K above the axial motion of the arm I may be varied, if necessary, by varying the relative distances of the points J and L, the throw of the crank D, and the distance between the points J and $d$ of the arm I. By increasing the throw of the crank D and decreasing the distance between the points J and $d$ of the arm I, and making the distance between the points L and $a'$ less, the greater will be the axial motion of the arm K.

The above-described mechanical movement is well adapted for use in that class of sewing-machines known as "oscillating-shuttle machines." When used in such a machine, the arm I may be fixed to a shaft, and motion may be imparted thereby to a feed-bar, while the shaft L, by reason of its increased axial motion, is better adapted for giving the shuttle the requisite movement.

The arm K is shown slotted, and a pin, $a'$, in the extension H engages in said slot. This slot is essential because of the varying position of the pin $a'$ to and from the center of the arm K; but it will be readily understood that any well-known equivalent of the pin and slot as a compensator for the changes of position of the pin $a$ in the slot may be used instead of the pin and slot. This application is a division of and direct continuation of an application filed by me December 7, 1880, No. 21,762.

Having described my invention, I claim—

1. The combination of the crank D, pitman F, connected to the arm I, and having a pin, $a'$, engaging in a slot, $a$, of the arm K, or the equivalent of said pin and slot, for increasing the axial motion of the arm K, substantially as specified.

2. The combination of the crank D, pitman F and extension H, the arm I, and the arm K, having shaft L, substantially as specified.

THOS. A. MACAULAY.

Witnesses:
W. A. BARTLETT,
WM. SECHER.